(12) United States Patent
Zhang et al.

(10) Patent No.: US 10,969,546 B2
(45) Date of Patent: Apr. 6, 2021

(54) ELECTRO-OPTIC MODULATOR WITH MONOCRYSTALLINE SEMICONDUCTOR WAVEGUIDES

(71) Applicant: Cisco Technology, Inc., San Jose, CA (US)

(72) Inventors: Xunyuan Zhang, Breinigsville, PA (US); Vipulkumar K. Patel, Breinigsville, PA (US); Prakash B. Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/198,251

(22) Filed: Nov. 21, 2018

(65) Prior Publication Data

US 2020/0158949 A1 May 21, 2020

(51) Int. Cl.
*G02B 6/122* (2006.01)
*G02B 6/136* (2006.01)
*G02B 6/12* (2006.01)

(52) U.S. Cl.
CPC .............. *G02B 6/122* (2013.01); *G02B 6/136* (2013.01); *G02B 2006/12061* (2013.01); *G02B 2006/12142* (2013.01)

(58) Field of Classification Search
None
See application file for complete search history.

(56) References Cited

U.S. PATENT DOCUMENTS

| 8,363,986 | B2 | 1/2013 | Webster et al. |
| 9,360,688 | B2 | 6/2016 | Patel et al. |
| 9,766,484 | B2 | 9/2017 | Adams et al. |
| 9,837,268 | B2 | 12/2017 | Qi et al. |

(Continued)

FOREIGN PATENT DOCUMENTS

| EP | 1613991 A2 | 1/2006 |
| EP | 2545401 A2 | 1/2013 |

OTHER PUBLICATIONS

Webster, et al, "An efficient MOS-capacitor based silicon modulator and CMOS drivers for optical transmitters" (IEEE 11th International Conference on Group IV Photonics (GFP), 2014, 3 pages.

(Continued)

*Primary Examiner* — Jerry Rahll
(74) *Attorney, Agent, or Firm* — Patterson + Sheridan, LLP

(57) ABSTRACT

A method of fabricating an optical apparatus comprises forming a first waveguide on a dielectric substrate. The first waveguide extends in a direction of an optical path. The first waveguide comprises a monocrystalline semiconductor material and is doped with a first conductivity type. The method further comprises depositing a first dielectric layer on the first waveguide, etching a first opening that extends at least partly through the first dielectric layer, and forming a second waveguide at least partly overlapping the first waveguide along the direction. The second waveguide is doped with a different, second conductivity type. Forming the second waveguide comprises depositing a monocrystalline semiconductor material on the first dielectric layer, whereby the first opening is filled with the deposited monocrystalline semiconductor material.

20 Claims, 11 Drawing Sheets

(56) References Cited

U.S. PATENT DOCUMENTS

2016/0170240 A1* 6/2016 Adams .................. G02B 6/136
385/3

OTHER PUBLICATIONS

Wu et al, "20Gb/s NRZ/PAM-4 1V transmitter in 40nm CMOS driving a Si-photonic modulator in 0.13μm CMOS" (Solid-State Circuits Conference Digest of Technical Papers (ISSCC), 2013, 4 Pages.

High-performance MOS-capacitor-type Si optical modulator and surface illumination-type GE photodetector for optical interconnection:Junichi Fujikata et al 2016 Jpn. J. Appl. Phys. 55 04EC01.

Efficient low-loss InGaAsP/Si hybrid MOS optical modulator Jae-Hoon Han, Frederic Boeuf, Junichi Fujikata, Shigeki Takahashi, Shinichi Takagi and Mitsuru Takenaka Nature Photonics | vol. 11 | Aug. 2017 p. 486.

Si1-xGex/Si Selective Etch with HCl for Thin Si-Channel Transistors Integration, Extended Abstracts of the 2007 International Conference on Solid State Devices and Materials, Tsukuba, 2007. pp. 716-717.

Frederico et al., "Silicon Sacrificial Layer Dry Etching (SSLDE) for free-standing RF MEMS architectures," [Accessed Online] https://cmi.epfl.ch/etch/files/MEMS03.pdf.

* cited by examiner

ELECTRO-OPTIC MODULATOR WITH MONOCRYSTALLINE SEMICONDUCTOR WAVEGUIDES

TECHNICAL FIELD

Embodiments presented in this disclosure generally relate to optical modulation, and more specifically, to semiconductor-based electro-optic modulators.

BACKGROUND

Many electro-optic devices exploit the free carrier dispersion effect to change both the real and imaginary parts of the refractive index. This exploitation is used since the unstrained pure crystalline silicon does not exhibit a linear electro-optic (Pockels) effect, and the refractive index changes due to the Franz-Keldysh effect and Kerr effect are very weak. Phase modulation in a specific region of optical devices, such as Mach-Zehnder modulators, total-internal-reflection (TIR)-based structures, cross switches, Y-switches, ring resonators and Fabry-Perot resonators, may be used to modulate the output intensity.

Free carrier concentration in electro-optic devices can be varied by injection, accumulation, depletion, or inversion of carriers. Most of such devices investigated to date present some common features: they require long interaction lengths (for example, 5-10 mm) and injection current densities higher than 1 kA/cm$^3$ in order to obtain a significant modulation depth. Long interaction lengths are undesirable in order to achieve high levels of integration and miniaturization for fabricating low-cost, compact device arrangements. Further, high current densities may induce unwanted thermo-optic effects as a result of heating the structure, which will cause an opposite effect on the real refractive index change relative to that associated with free carrier movement, thus reducing its effectiveness.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
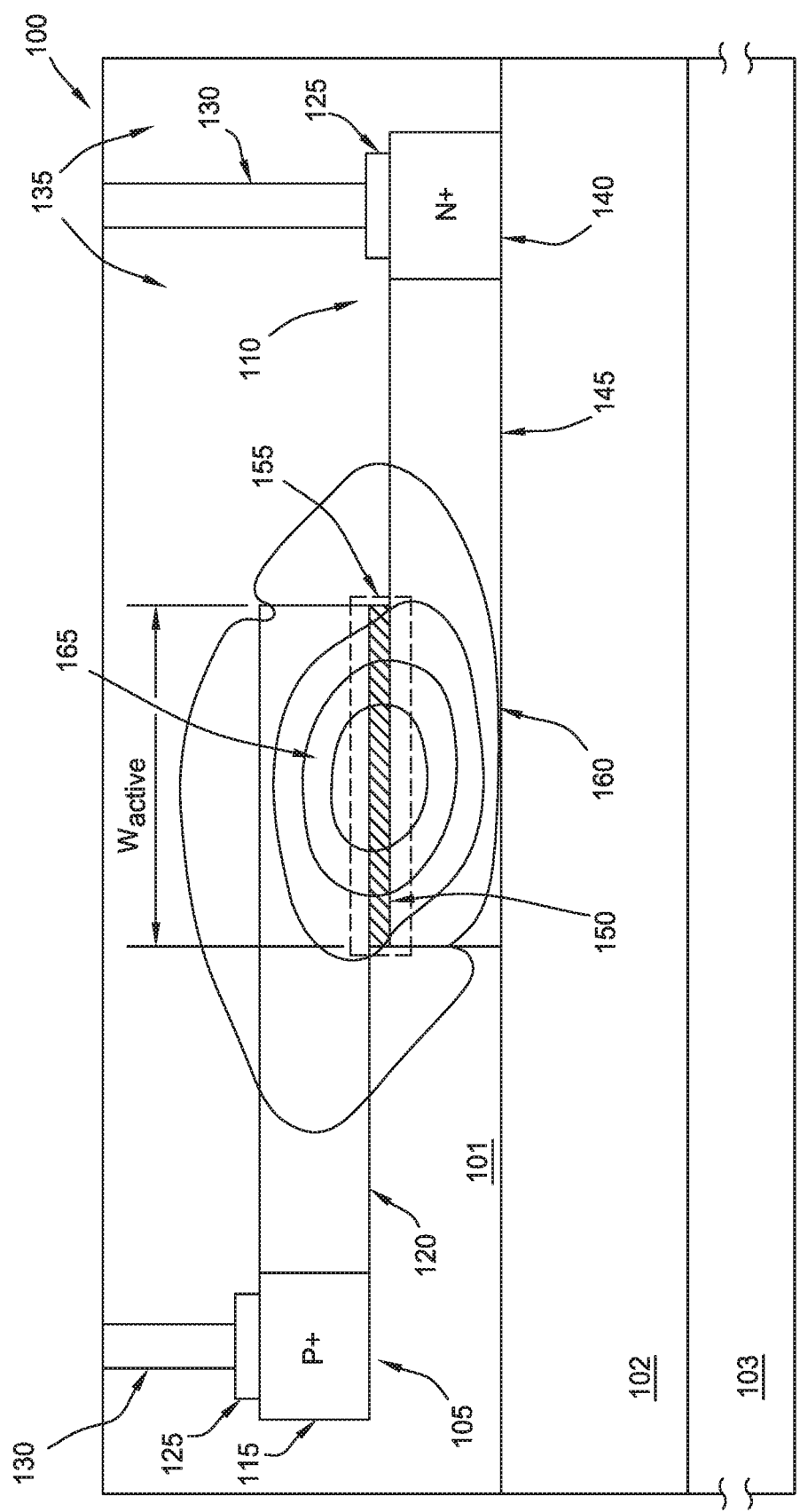
FIG. 1 is a cross-sectional view of an exemplary optical apparatus, according to one or more embodiments.

One embodiment presented in this disclosure is a method of fabricating an optical apparatus. The method comprises forming a first waveguide on a dielectric substrate. The first waveguide extends in a direction of an optical path. The first waveguide comprises a monocrystalline semiconductor material and is doped with a first conductivity type. The method further comprises depositing a first dielectric layer on the first waveguide, etching a first opening that extends at least partly through the first dielectric layer, and forming a second waveguide at least partly overlapping the first waveguide along the direction. The second waveguide is doped with a different, second conductivity type. Forming the second waveguide comprises depositing a monocrystalline semiconductor material on the first dielectric layer, whereby the first opening is filled with the deposited monocrystalline semiconductor material.

Another embodiment presented in this disclosure is an optical apparatus comprising a first waveguide on a dielectric substrate. The first waveguide extends in a direction of an optical path. The first waveguide comprises a monocrystalline semiconductor material and is doped with a first conductivity type. The optical apparatus further comprises a second waveguide at least partly overlapping the first waveguide along the direction. The second waveguide comprises a monocrystalline semiconductor material and is doped with a different, second conductivity type. The optical apparatus further comprises a dielectric layer arranged between portions of the first waveguide and the second waveguide. The monocrystalline semiconductor material used to form the second waveguide extends at least partly through the dielectric layer.

Another embodiment presented in this disclosure is a method of fabricating an optical apparatus. The method comprises forming a first waveguide on a dielectric substrate. The first waveguide extends in a direction of an optical path. The first waveguide comprises a monocrystalline semiconductor material and is doped with a first conductivity type. The method further comprises depositing a dielectric layer on the first waveguide, and forming a channel within the dielectric layer. The channel includes an elongated portion that is substantially parallel to the first waveguide, a first opening that extends from the elongated portion to the first waveguide, and a second opening in fluid communication with the elongated portion. The method further comprises forming a second waveguide at least partly overlapping the first waveguide along the direction. The second waveguide is doped with a different, second conductivity type. Forming the second waveguide comprises depositing a monocrystalline semiconductor material into the channel through the second opening, whereby the first opening is filled with the deposited monocrystalline semiconductor material.

Example Embodiments

As optical network devices increasingly support greater bandwidths, a greater modulation bandwidth is required of electro-optic modulators included in the optical network devices. For electro-optic modulators using semiconductor waveguides that are at least partly overlapping, the modulation bandwidth of an electro-optic modulator is a function of a series resistance of each semiconductor waveguide and a capacitance between the semiconductor waveguides. An optical insertion loss of the electro-optic modulator is a function of doping levels of the semiconductor waveguides (which affect a light absorption characteristic) and the presence of grain boundaries (which affect a light scattering characteristic).

Optimizing performance of an electro-optic modulator may include reducing series resistance in combination with reducing optical insertion loss. However, for some semiconductor materials, reducing the series resistances may result in increased optical insertion loss. For example, in implementations of an electro-optic modulator having a polycrystalline silicon (also referred to as poly-silicon or poly-Si) waveguide, reducing a series resistance requires higher doping levels, which in turn increases the optical insertion loss of the waveguide.

According to one or more embodiments, a method of fabricating an optical apparatus comprises forming a first waveguide on a dielectric substrate. The first waveguide extends in a direction of an optical path and comprises a monocrystalline semiconductor material (e.g., silicon, germanium, gallium arsenide) doped a first conductivity type. The method further comprises forming a second waveguide at least partially overlapping the first waveguide along the direction. The second waveguide comprises a monocrystalline semiconductor material doped a different, second conductivity type.

Beneficially, using monocrystalline semiconductor-based waveguides in the optical apparatus mitigates the lower electron mobility and/or higher optical insertion loss experienced, e.g., when using waveguide formed of a polycrystalline semiconductor material in combination with a waveguide formed of a monocrystalline semiconductor material. As a result, the optical apparatus is capable of supporting significantly greater optical bandwidths, such as modulating at 100 Gb/s or greater. Further, the optical apparatus may be fabricated without requiring advanced fabrication techniques, which tends to reduce fabrication cost and complexity. For example, a low-temperature epitaxy process that is commonly used for complementary metal-oxide-semiconductor (CMOS) source and drain growth may be used to form at least one of the monocrystalline semiconductor material waveguides of the optical apparatus. More specifically, the low-temperature epitaxy process may be used to provide constrained (guided) lateral overgrowth of the monocrystalline semiconductor material.

FIG. 1 is a cross-sectional view of an exemplary optical apparatus 100, according to one or more embodiments. In some embodiments, the optical apparatus 100 comprises a silicon-on-insulator (SOI) based electro-optic modulator. The optical apparatus 100 comprises a semiconductor layer 101, an insulator layer 102 (which may also be referred to as a dielectric layer), and a semiconductor substrate 103. For example, the optical apparatus 100 may be formed using a SOI substrate, such that the semiconductor layer 101 and the semiconductor substrate 103 are formed of monocrystalline silicon, and the insulator layer 102 comprises a buried oxide (BOX) layer.

Although embodiments herein refer to the semiconductor layer 101 and the semiconductor substrate 103 as monocrystalline silicon, the disclosure is not limited to such. For example, other semiconductor materials (e.g., monocrystalline germanium) or optically transmissive materials may be used to form the structure of the optical apparatus 100. Moreover, the semiconductor layer 101 and the semiconductor substrate 103 may be made from the same material, but in other embodiments may be made from different materials.

A thickness of the semiconductor layer 101 may range from less than 100 nanometers to greater than a micron. In some embodiments, the thickness of the semiconductor layer 101 is between 100 and 300 nanometers. The thickness of the insulator layer 102 may vary depending on the desired application. For example, the thickness of the insulator layer 102 may directly depend on the size of the optical mode being coupled to the optical apparatus 100 and the desired efficiency. As such, the thickness of the insulator layer 102 may range from less than one micron to tens of microns. The thickness of the semiconductor substrate 103 may also vary depending on the desired application of the optical apparatus 100. For example, the semiconductor substrate 103 may be the thickness of a typical semiconductor wafer (e.g., between 100 and 700 microns) or may be thinned and mounted on another substrate.

For optical applications, the semiconductor layer 101 and the insulator layer 102 (e.g., silicon oxide, silicon nitride, and the like) may provide contrasting refractive indexes that vertically confine an optical signal in a waveguide formed in the semiconductor layer 101. In a later processing step, the semiconductor layer 101 of the optical apparatus 100 may be etched to form one or more silicon waveguides. Because silicon has a high refractive index compared to an insulator material such as silicon oxide, the optical signal remains primarily in the waveguide as it propagates across the semiconductor layer 101.

As shown, the optical apparatus 100 includes an upper waveguide 105 doped with a first conductivity type (e.g., P-type). In some embodiments, the upper waveguide 105 comprises monocrystalline silicon. The upper waveguide 105 is spaced apart from a lower waveguide 110 doped with a second, different conductivity type (e.g., N-type) by a gate dielectric layer 150. In some embodiments, the lower waveguide 110 comprises monocrystalline silicon. In other embodiments, one or both of the upper waveguide 105 and the lower waveguide 110 are formed of another monocrystalline semiconductor material (e.g., germanium, gallium arsenide).

The arrangement of the upper waveguide 105, the gate dielectric layer 150, and the lower waveguide 110 forms a silicon-insulator-silicon capacitor (also referred to as SISCAP) waveguide that provides efficient, high-speed optical modulation of an optical signal passing through the optical apparatus 100. Specifically, FIG. 1 depicts a cross-section of the SISCAP structure in which the optical signal travels in a direction projecting into, or out of, the page. FIG. 1 illustrates the confinement of an optical mode 160 of the optical signal by the insulator layer 102 and the dielectric material 135 (e.g., silicon oxide or silicon nitride) surrounding the upper waveguide 105 and the lower waveguide 110. Moreover, the dimensioning of the upper waveguide 105 and the lower waveguide 110 (e.g., thicknesses and widths) may be selected to provide a desired confinement of the optical mode 160. For example, the intensity of the optical mode 160 may generally increase when approaching a center 165 of the optical mode 160. Through selecting properties of the upper waveguide 105 and the lower waveguide 110, the more intense portions of the optical mode 160 may be shaped or better confined to allow more efficient modulation of the optical signal.

The gate dielectric layer 150 establishes a charge modulation region 155 (also referred to as a charge accumulation region) shown by a dashed box in which free carriers (e.g., electrons and holes) flow into and out of the (P-doped and N-doped) the upper waveguide 105 and the lower waveguide 110. Doing so creates an active region (defined by $W_{active}$) where the switching function associated with the optical apparatus 100 (e.g., at switching speeds of 1 Gb/s or greater, such as 10 Gb/s, 28 Gb/s, 40 Gb/s, 100 Gb/s, 200 Gb/s, 400 Gb/s, etc.) can be controlled by a voltage potential applied across the gate dielectric layer 150. In one embodiment, the voltage potential is used to alter the phase of the optical signal propagating through the optical apparatus 100 as in, for example, a Mach-Zehnder interferometer (MZI). However, the electro-optic modulators described herein may also be used in other types of devices such as ring resonators, Fabry-Perot cavities, etc.

The gate dielectric layer 150 may be referred to as either "gate dielectric" or "gate oxide," where it is to be understood that an oxide is only an exemplary form of a dielectric that may be used in the optical apparatus 100. The gate dielectric layer 150 may comprise any material that allows for fast charging and/or discharging of the free carriers (e.g., a material which enables switching speeds of 1 Gb/s or greater). A non-limiting list of suitable materials include hafnium oxide, oxynitride, bismuth oxide, silicon nitride, silicon oxide, and combinations of these materials. Furthermore, using high-K dielectric materials as the gate dielectric provide higher capacitance and greater charge densities, when compared with dielectrics having lower dielectric constants (assuming same thickness and voltage potential). For example, hafnium oxide and silicon nitride (high-K dielectrics) have higher dielectric constants than silicon oxide, and thus, enable greater charge densities across the gate dielectric layer 150 relative to using silicon oxide. In some cases, using the higher voltages increases the modulation efficiency—i.e., the amount the optical signal is phase-shifted relative to the amount of voltage applied.

As shown, a lower surface of the gate dielectric layer 150 contacts an upper surface of a first waveguide (i.e., the lower waveguide 110), and an upper surface of the gate dielectric layer 150 contacts a lower surface of a second waveguide (i.e., the upper waveguide 105). Although the Figures described herein illustrate the gate dielectric layer 150 between the oppositely-doped upper waveguide 105 and lower waveguide 110, this is not a requirement. In some alternate embodiments, the gate dielectric layer 150 is omitted and the upper waveguide 105 and the lower waveguide 110 directly contact to form a P-N junction. In this example, the P-N junction establishes the charge modulation region 155 where the free carriers flow into and out of the waveguides. However, including the gate dielectric layer 150 may improve the efficiency of the optical modulation.

As shown, the upper waveguide 105 is doped P-type while the lower waveguide 110 is doped N-type. However, for all the embodiments where the dopant type is specified, the dopant types may be reversed—e.g., the upper waveguide 105 may be doped N-type while the lower waveguide 110 is P-type.

A width of the upper waveguide 105 and the lower waveguide 110 may be selected to keep electrical contacts 125 and/or vias 130 disposed away from the optical mode 160. In some embodiments, the electrical contacts 125 and/or the vias 130 are metallic or formed from silicide. Because electrically conductive materials may have a deleterious effect on optical modulation, the upper waveguide 105 and the lower waveguide 110 may be designed such that any conductive materials are sufficiently outside the boundaries of the optical mode 160. Moreover, as shown in FIG. 1, the lateral regions 115, 140 of the upper waveguide 105 and the lower waveguide 110 that are disposed proximate to the electrical contacts 125 are more heavily doped than the portions of the upper waveguide 105 and the lower waveguide 110 in which the optical modulation occurs (i.e., silicon portions 120, 145). This arrangement may improve the electrical connection between the upper waveguide 105 and the lower waveguide 110 and the electrical contacts 125, thereby decreasing the electrical resistance and related RC time constant associated with the optical apparatus 100. Moreover, increasingly doped portions of the upper waveguide 105 and the lower waveguide 110 disposed proximate to the electrical connection to an external voltage source may be applied to any of the embodiments described herein. Furthermore, the concentration of dopant may increase in the upper waveguide 105 and the lower waveguide 110 as the distance from the optical mode 160 increases. Because the dopant may have a deleterious effect on the optical signal, the dopant concentration in the upper waveguide 105 and the lower waveguide 110 where the optical mode 160 is located may be lightly doped. The dopant concentration may be increased in a step-wise or a substantially continuous manner as the distance from the optical mode 160 increases. Doing so improves the electrical conductivity of the upper waveguide 105 and the lower waveguide 110 and mitigates the negative effect of the dopant on the optical signal. Furthermore, in one embodiment, the electrical contacts 125 may be omitted and the vias 130 contact the (more heavily-doped) lateral regions 115, 140 directly.

In some embodiments, the width of the active region (i.e., corresponding to the width W active of the gate dielectric layer 150) is less than a micron, and more specifically, less than half a micron. In some embodiments, the thickness of the upper waveguide 105 and the lower waveguide 110 is between 50 and 200 nanometers. In some embodiments, to center the greatest intensity of the light in the optical mode 160 in the charge modulation region 155, the respective thicknesses of the upper waveguide 105 and the lower waveguide 110 are the same. In some embodiments, the thickness of the gate dielectric layer 150 is between 1 and 20 nanometers.

While one simple example of the optical apparatus 100 is illustrated in FIG. 1, other embodiments may include various alternative geometries that provide a desired performance of the optical apparatus 100. For example, other embodiments may dispose one of the upper waveguide 105 and the lower waveguide 110 substantially entirely above the other of the upper waveguide 105 and the lower waveguide 110 (i.e., in a vertical arrangement). As discussed herein, other embodiments may also include ridges in one or more of the upper waveguide 105 and the lower waveguide 110, which may help to further confine the optical mode 160 and to improve efficiency of the optical apparatus 100.

Figure 2:
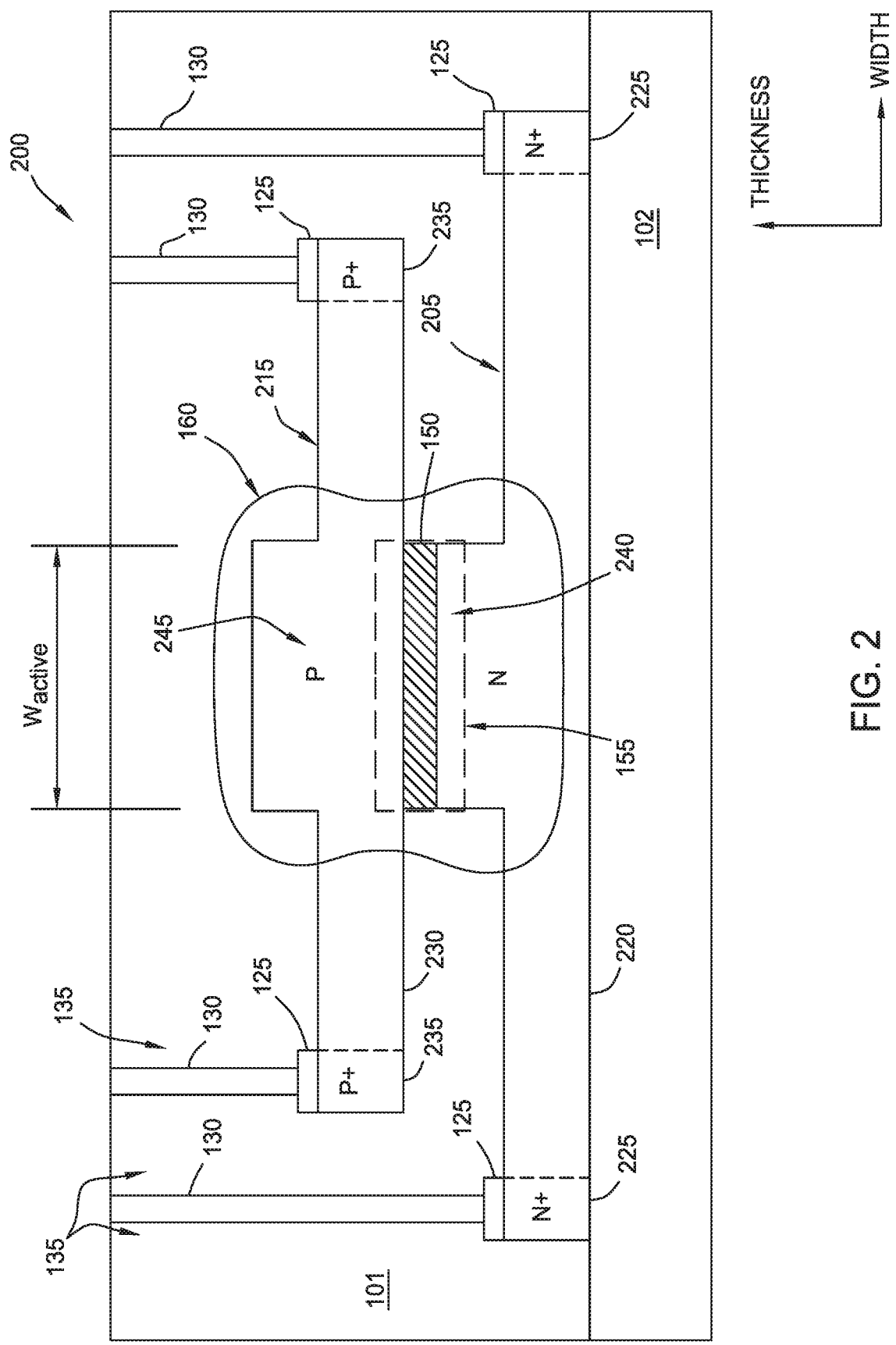
FIG. 2 is a cross-sectional view of an exemplary optical apparatus with overlapping ridges, according to one or more embodiments.

FIG. 2 is a cross-sectional view of an exemplary optical apparatus 200 with overlapping ridges, according to one or more embodiments. The features described with respect to the optical apparatus 200 may be used in conjunction with other embodiments.

More specifically, the optical apparatus 200 is an electro-optic modulator that comprises a lower waveguide 205 doped a first conductivity type (e.g., N-type). The lower waveguide 205 is spaced apart by the gate dielectric layer 150 from an upper waveguide 215 that is doped a second, different conductivity type (e.g., P-type). As shown, a lower surface of the gate dielectric layer 150 contacts an upper surface of a first waveguide (i.e., the lower waveguide 205), and an upper surface of the gate dielectric layer 150 contacts a lower surface of a second waveguide (i.e., the upper waveguide 215). In some embodiments, the lower waveguide 205 and the upper waveguide 215 comprise monocrystalline silicon. In other embodiments, one or both of the lower waveguide 205 and the upper waveguide 215 are formed of another monocrystalline semiconductor material (e.g., germanium, gallium arsenide).

The arrangement of the lower waveguide 205, the gate dielectric layer 150, and the upper waveguide 215 forms a SISCAP waveguide that provides efficient, high-speed optical modulation of an optical signal passing through the optical apparatus 200. FIG. 2 illustrates the vertical and lateral confinement of the optical mode 160 of the signal by the insulator layer 102 and the dielectric material 135 (e.g., silicon oxide or silicon nitride) surrounding the lower waveguide 205 and the upper waveguide 215. Moreover, the dimensioning of the lower waveguide 205 and the upper waveguide 215 (e.g., thicknesses and widths) may be selected to provide a desired confinement of the optical mode 160.

The lower waveguide 205 comprises a central region 220 and lateral regions 225 that are more heavily doped than the central region 220. The upper waveguide 215 comprises a central region 230 and lateral regions 235 that are more heavily doped than the central region 230. The lower waveguide 205 and the upper waveguide 215 further comprise respective ridges 240, 245 extending from the respective central regions 220, 230. In this way, the lower waveguide 205 and the upper waveguide 215 may also be referred to as ridge waveguides or ribbed waveguides. The ridges 240, 245 are at least partly overlapping with each other. In some embodiments, the ridges 240, 245 are aligned at the charge modulation region 155. In some embodiments, the ridges 240, 245 are centered along a width of the respective lower waveguide 205 and upper waveguide 215. In other embodiments, one or more of the ridges 240, 245 are not centered.

The ridges 240, 245 aid in confining the optical mode laterally (e.g., in the width direction) in the optical apparatus 200. As shown, the ridge 240 of the lower waveguide 205 is surrounded on two sides by the dielectric material 135 which confines the optical mode 160 near the charge modulation region 155 due to the different refractive indexes associated with the dielectric material 135 and the lower waveguide 205.

If the ridge 240 was omitted and the upper surface of the lower waveguide 205 directly contacted the gate dielectric layer 150, the optical mode 160 may spread out laterally within the lower waveguide 205 more so than what is illustrated in FIG. 2. As such, more of the light in the optical mode 160 would be outside the charge modulation region 155 thereby reducing the efficiency of the optical apparatus 200. In one embodiment, the thicknesses of the ridges 240, 245 are around 40-60% of the thickness of the bottom portions of the lower waveguide 205 and the upper waveguide 215. Furthermore, the actual thickness values of the ridges 240, 245 may be selected to achieve a desired confinement of the optical mode 160 in the lateral dimension (i.e., the width dimension) relative to the doping levels and distances of the lateral regions 225, 235 from the portion of the lower waveguide 205 and the upper waveguide 215 that overlap with the gate dielectric layer 150.

Furthermore, by including the ridge 245 in the upper waveguide 215, the optical apparatus 200 may have a greater efficiency than an implementation including only the ridge 240. In the SISCAP design shown, the greatest intensity of the optical signal occurs approximately in the middle of the optical mode 160. Without the ridge 245, the center of the optical mode 160 may be positioned below the gate dielectric layer 150. Here, the center of the optical mode 160 is positioned near or proximate to the gate dielectric layer 150. This results in the greatest intensity of the optical signal falling within the charge modulation region 155. Stated differently, although adding the ridge 245 may decrease the vertical confinement of the optical mode 160, the ridge 245 aligns the optical mode 160 such that the greatest intensity of the optical signal is within the charge modulation region 155, thereby improving efficiency of the optical apparatus 200.

Figure 3:
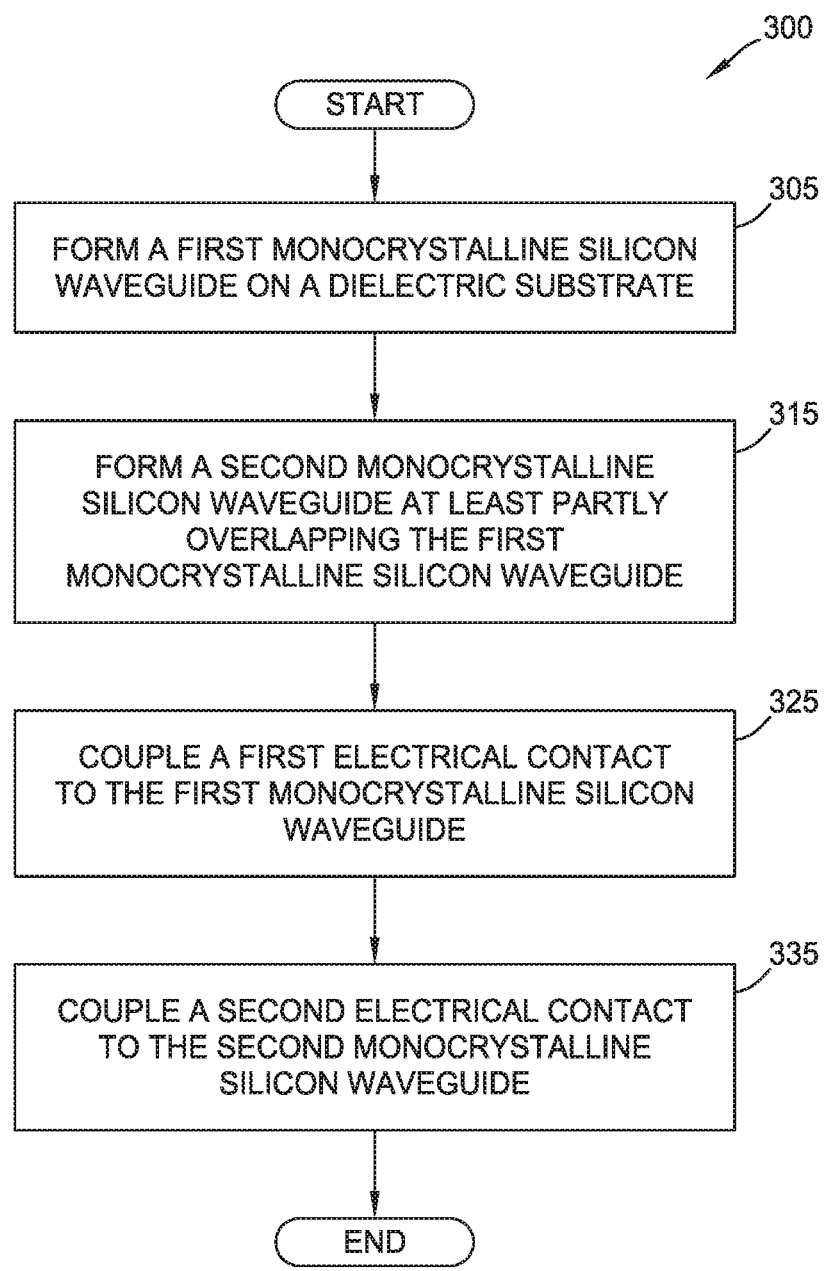
FIG. 3 is an exemplary method of fabricating an optical apparatus, according to one or more embodiments.

FIG. 3 is an exemplary method 300 of fabricating an optical apparatus, according to one or more embodiments. The features of the method 300 may be used in conjunction with other embodiments, such as fabricating the optical apparatus 100 of FIG. 1 or the optical apparatus 200 of FIG. 2.

The method 300 begins at block 305, where a first monocrystalline silicon waveguide is formed on a dielectric substrate. In some embodiments, the first monocrystalline silicon waveguide is formed in a silicon layer of a SOI substrate. At block 315, a second monocrystalline silicon waveguide is formed. The second monocrystalline silicon waveguide is at least partly overlapping the first monocrystalline silicon waveguide. In some embodiments, the second monocrystalline silicon waveguide is separated by a dielectric layer from the first monocrystalline silicon waveguide, and is formed by depositing monocrystalline silicon into a channel formed within the dielectric layer. Additional details with respect to blocks 305 and 315 are described with respect to FIGS. 4A and 4B.

At block 325, a first electrical contact is coupled to the first monocrystalline silicon waveguide. At block 335, a second electrical contact is coupled to the second monocrystalline silicon waveguide. Additional details with respect to blocks 325 and 335 are also described with respect to FIGS. 4A and 4B. The method 300 ends following completion of block 335.

Figure 4A:
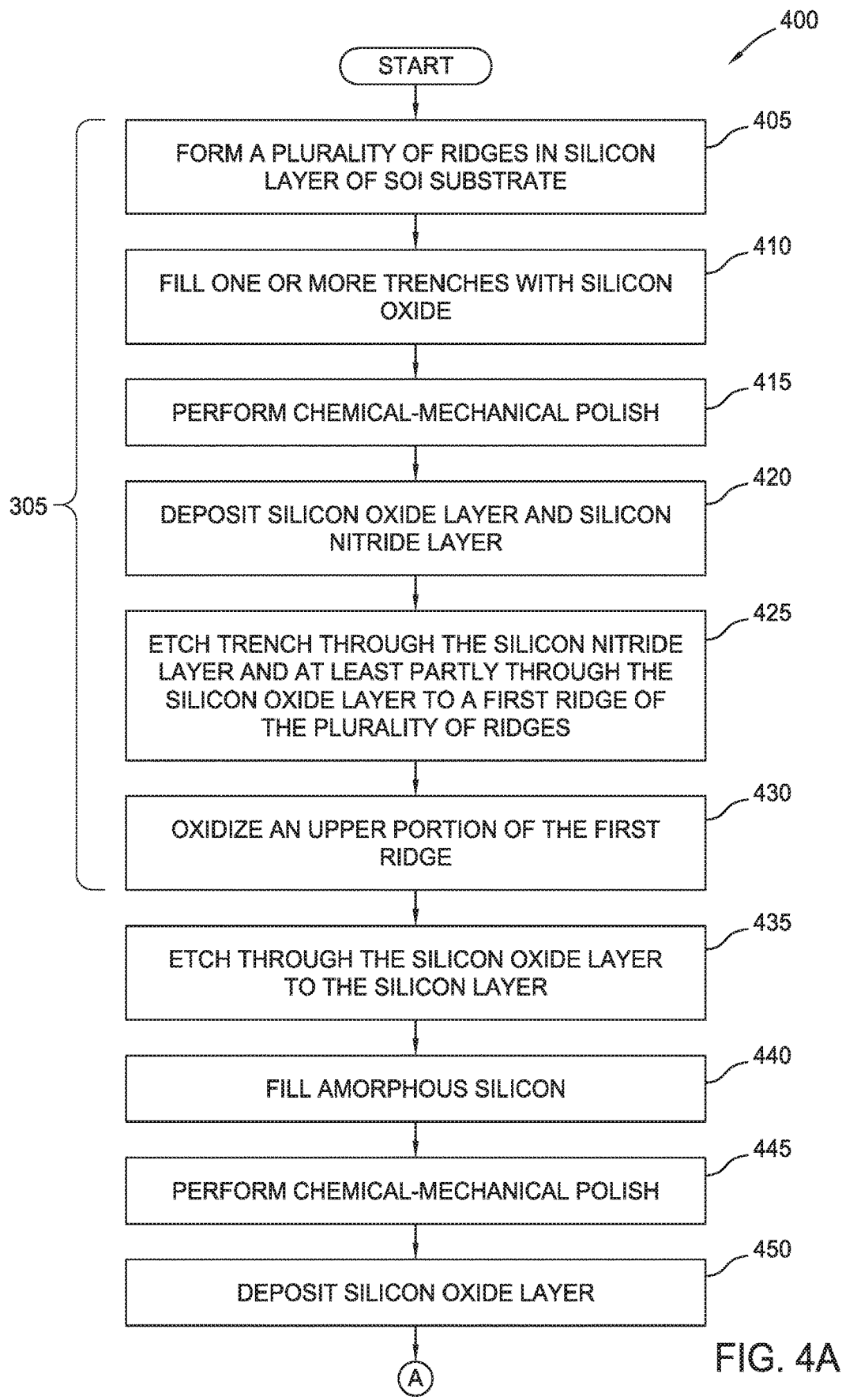
FIGS. 4A-4B illustrate an exemplary method of fabricating an optical apparatus using a silicon-on-insulator substrate, according to one or more embodiments.
Figure 4B:
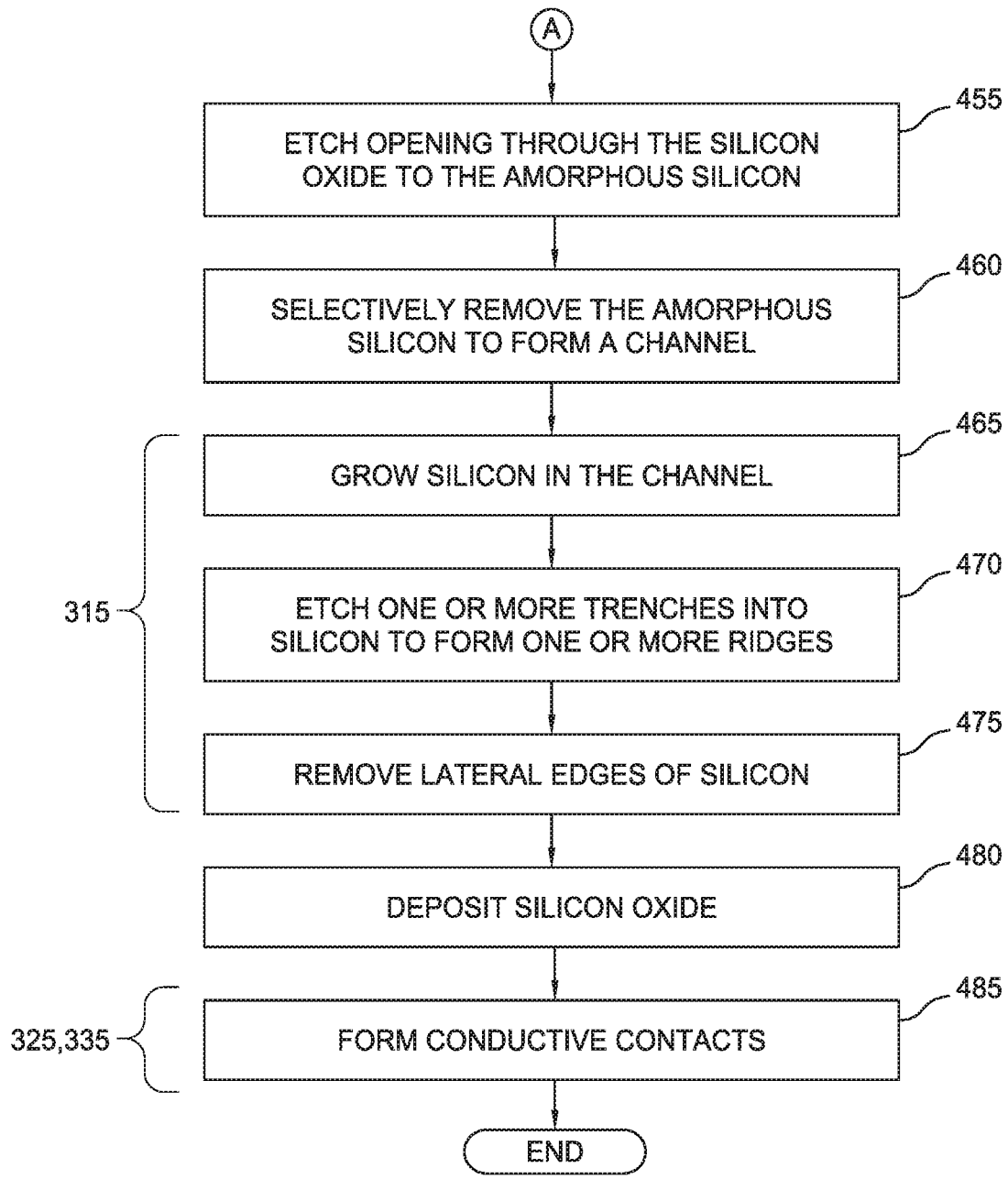

FIGS. 4A and 4B illustrate an exemplary method 400 of fabricating an optical apparatus using a silicon-on-insulator substrate, according to one or more embodiments. The features of the method 400 may be used in conjunction with other embodiments, such as a specific implementation of the method 300 of FIG. 3. Further, the blocks of the method 400 will be described with reference to the sequence illustrated in FIGS. 5A-5R.

Figure 5A:
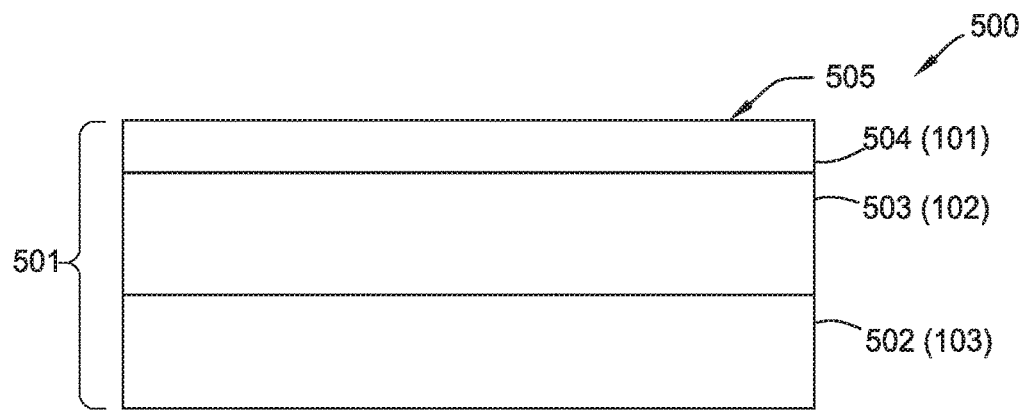
FIGS. 5A-5R illustrate an exemplary sequence of fabricating an optical apparatus using a silicon-on-insulator substrate, according to one or more embodiments.
Figure 5B:
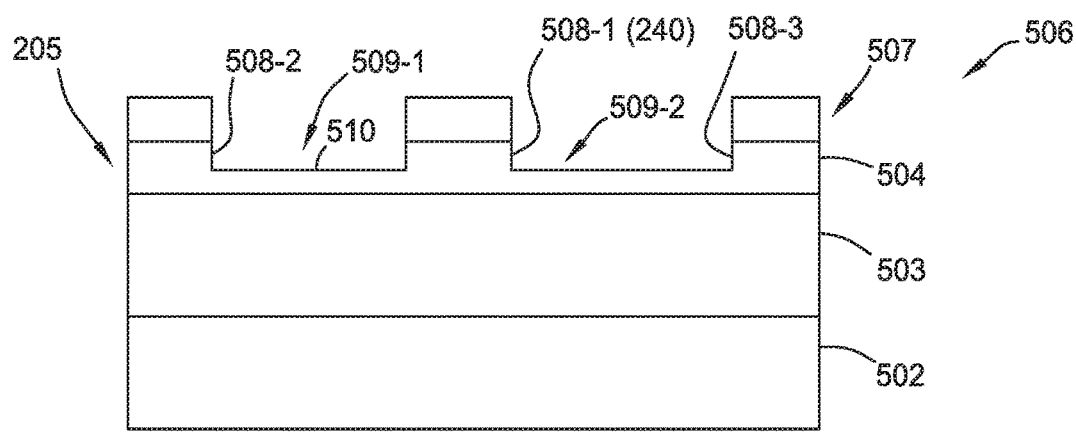
Figure 5C:
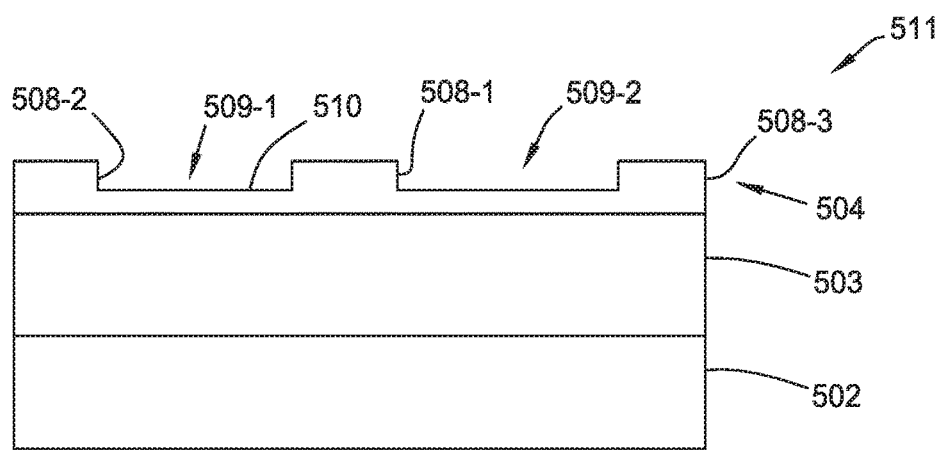
Figure 5D:
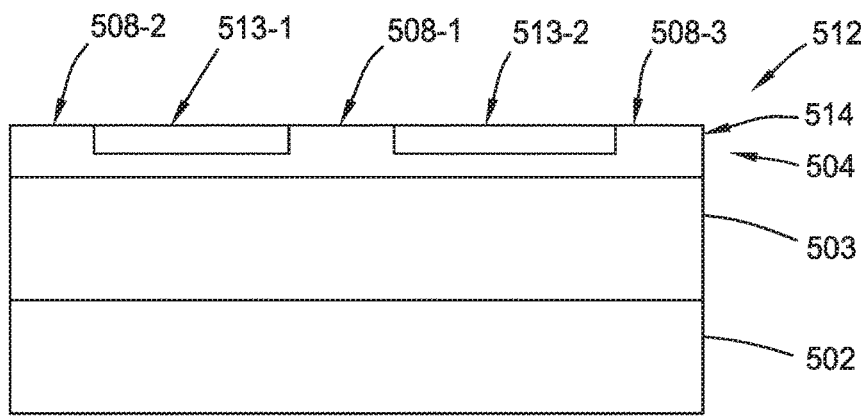
Figure 5E:
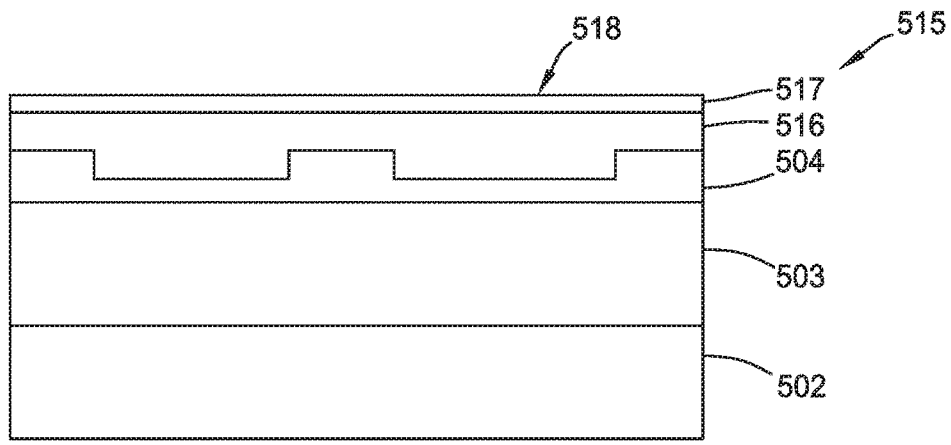
Figure 5F:
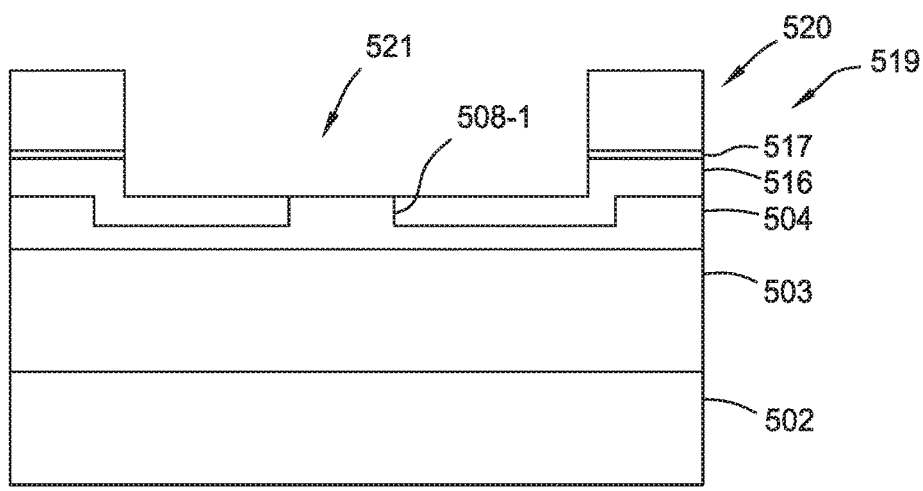
Figure 5G:
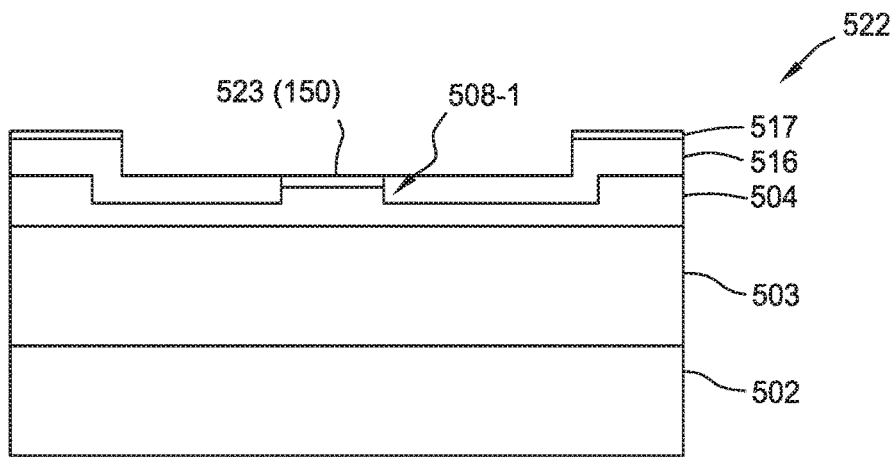
Figure 5H:
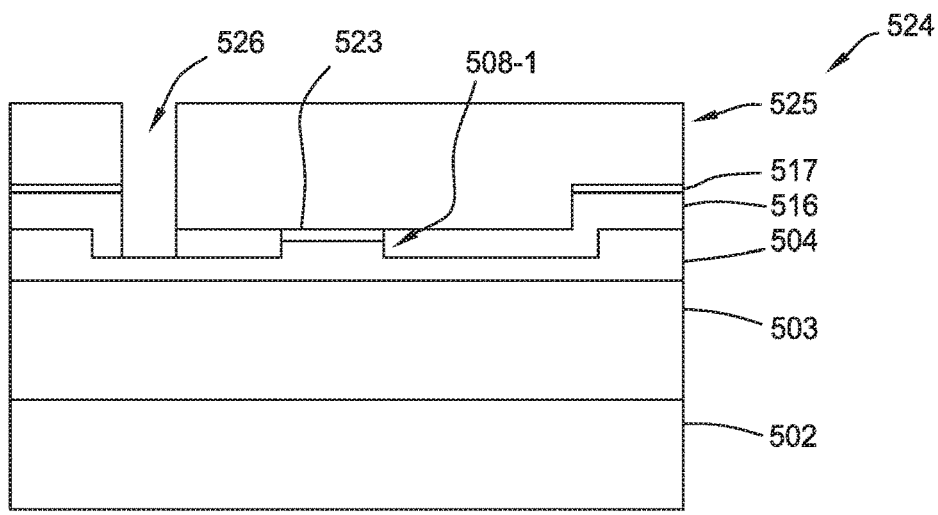
Figure 5I:
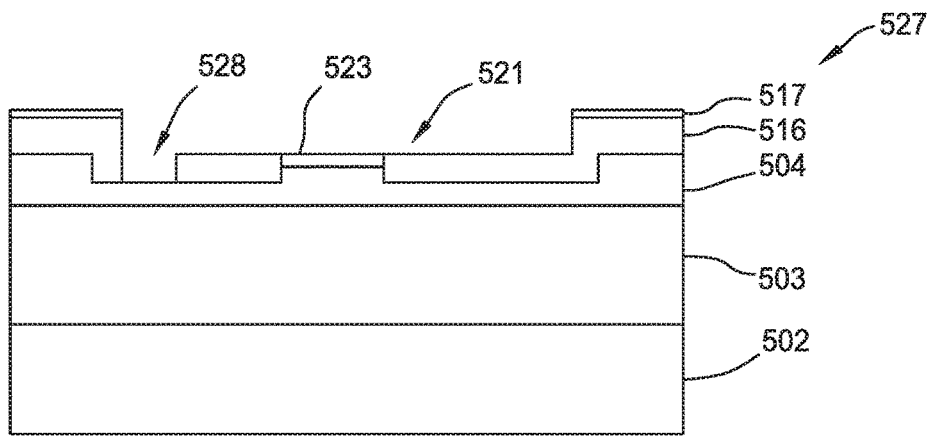
Figure 5J:
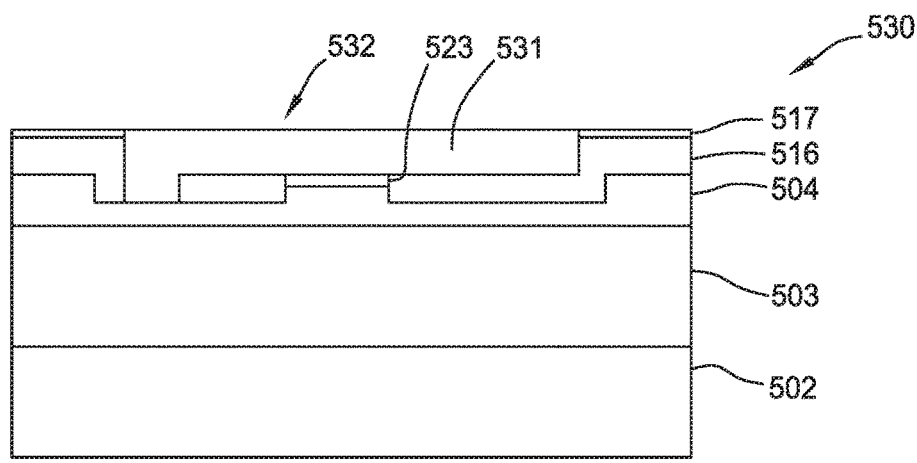
Figure 5K:
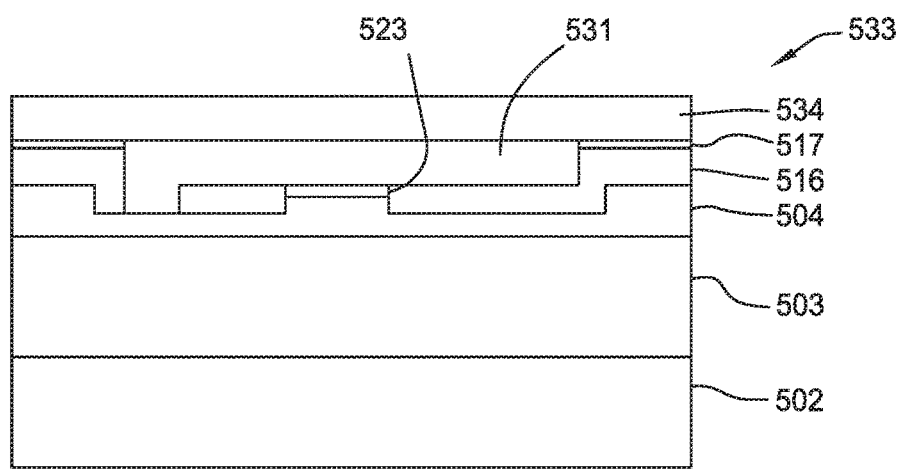
Figure 5L:
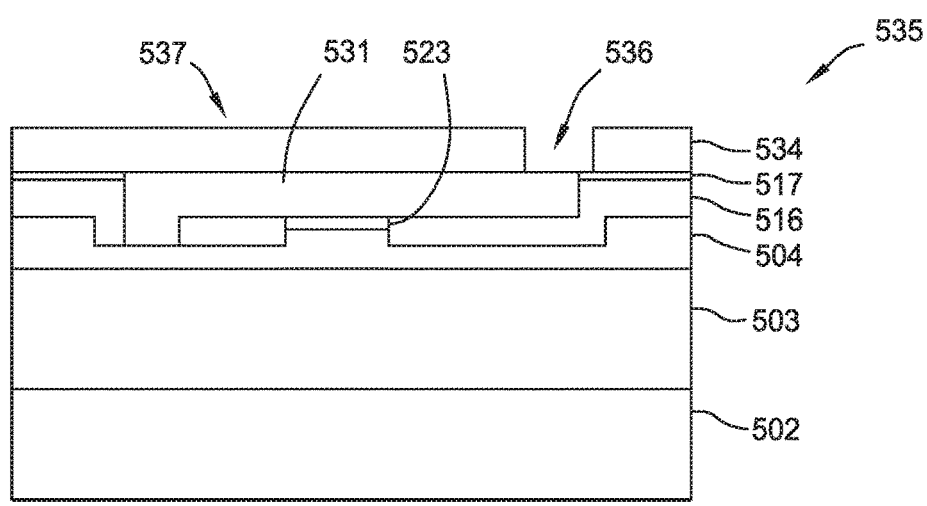
Figure 5M:
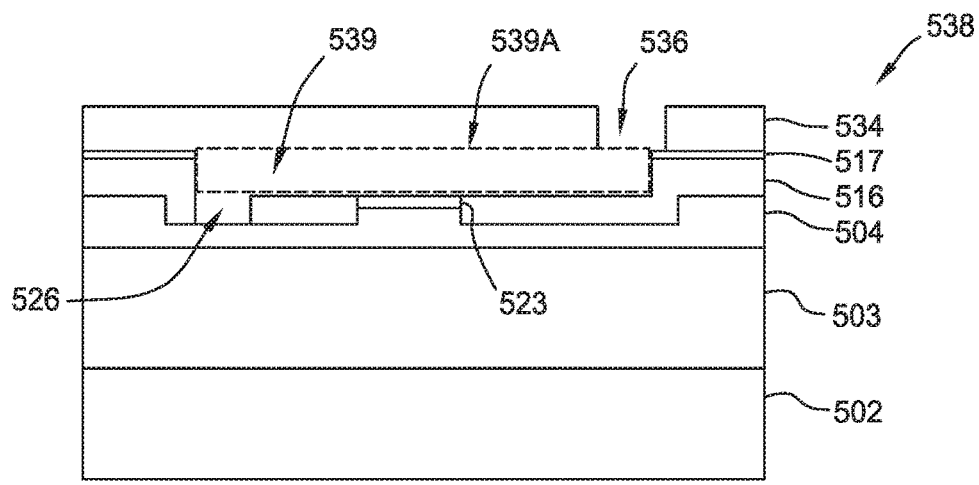
Figure 5N:
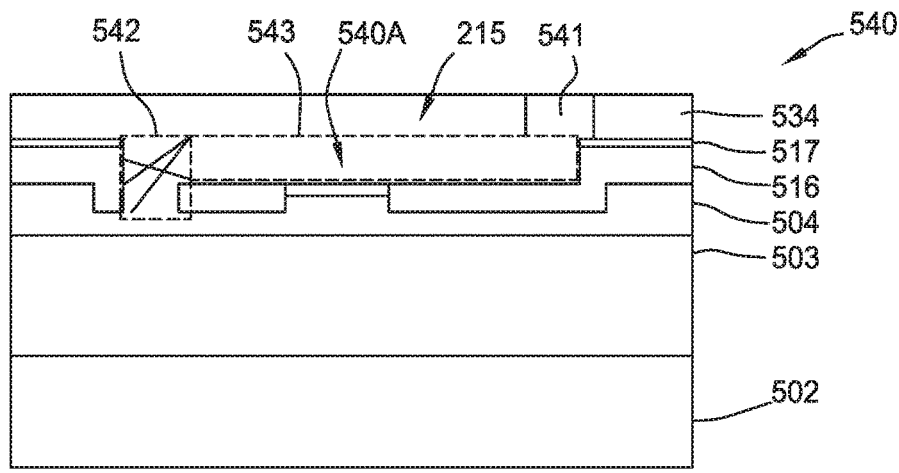
Figure 5O:
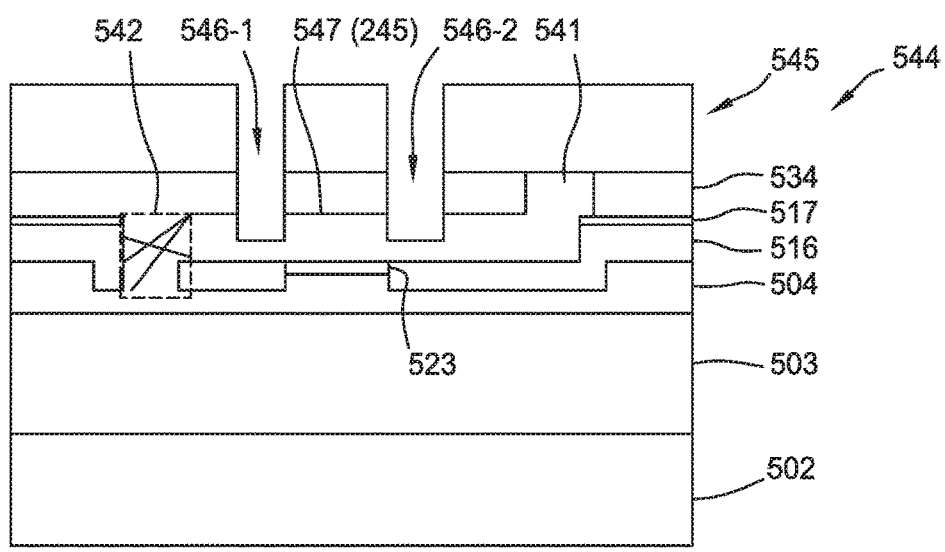
Figure 5P:
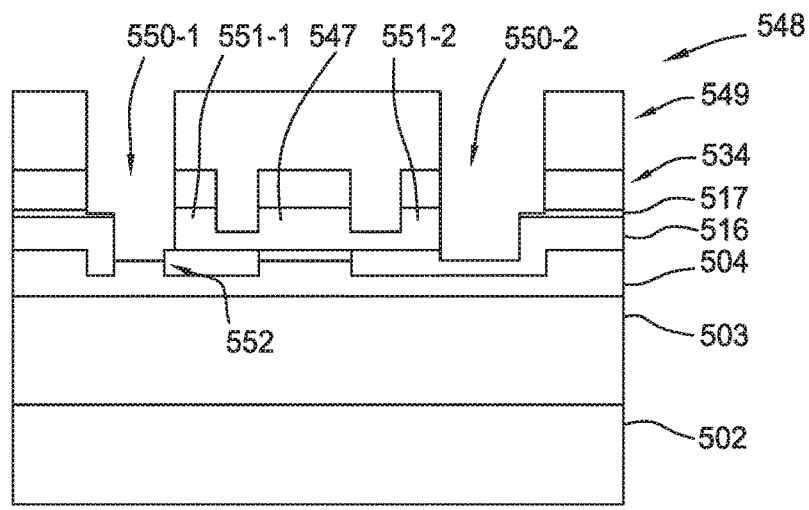
Figure 5Q:
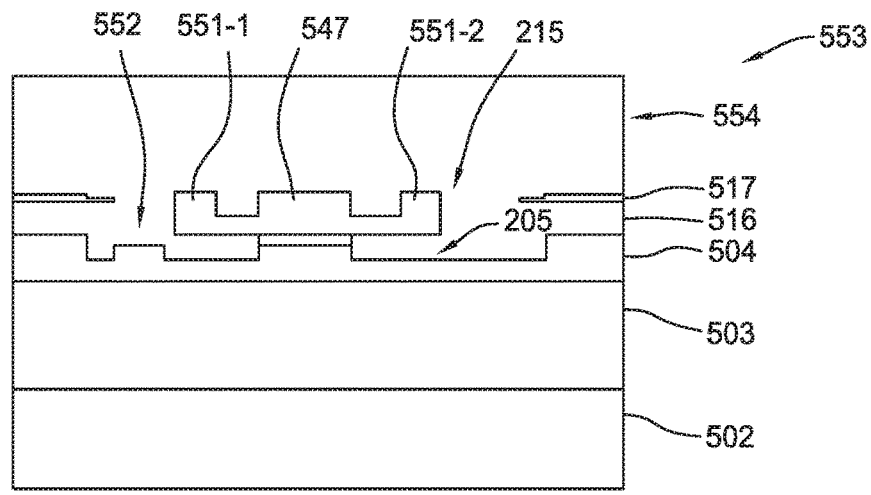
Figure 5R:
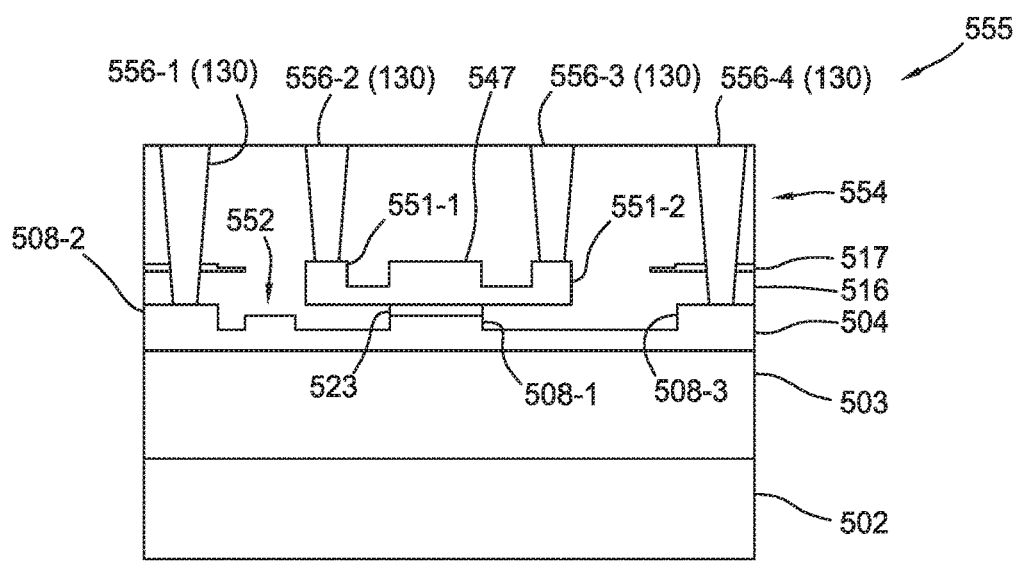

The method 400 begins at block 405, where a plurality of ridges is formed in a silicon layer of a SOI substrate. Diagram 500 of FIG. 5A depicts a SOI substrate 501 comprising a silicon substrate 502 (representing one example of the semiconductor substrate 103 of FIG. 1), a buried oxide (BOX) layer 503 (representing one example of the insulator layer 102) overlapping the silicon substrate 502, and a silicon layer 504 (representing one example of the semiconductor layer 101) overlapping the BOX layer 503. In some embodiments, the silicon layer 504 comprises monocrystalline silicon. The silicon substrate 502, the BOX layer 503, and the silicon layer 504 are not drawn to scale. The thicknesses of the silicon substrate 502, the BOX layer 503, and the silicon layer 504 may be consistent with the description of the semiconductor substrate 103, the insulator layer 102, and the semiconductor layer 101 with respect to FIG. 1.

In diagram 506, a silicon nitride layer 507 is deposited or otherwise arranged on a top surface 505 of the silicon layer 504. In some embodiments, the silicon nitride layer 507 is deposited using chemical vapor deposition (CVD), plasma-enhanced CVD (PECVD), or other suitable techniques. In some embodiments, the silicon nitride layer 507 forms a hardmask. Other types of masking layers are also contemplated. Based on the configuration of the silicon nitride layer 507, an etching process forms trenches 509-1, 509-2 that extend partly through the silicon layer 504 to a surface 510. In some embodiments, the trenches 509-1, 509-2 are formed using anisotropic etching. In some embodiments, the trenches 509-1, 509-2 extend to a same depth. In other embodiments, the trenches 509-1, 509-2 extend to different depths. The silicon nitride layer 507 is removed from the silicon layer 504 in diagram 511.

The plurality of ridges comprises a first ridge 508-1, a second ridge 508-2, and a third ridge 508-3. Other numbers of ridges are also contemplated, such as one, two, four, five, and so forth. The first ridge 508-1 is arranged between the second ridge 508-2 and the third ridge 508-3. Stated another way, the second ridge 508-2 and the third ridge 508-3 are arranged laterally from the first ridge 508-1. In some embodiments, the second ridge 508-2 and the third ridge 508-3 are arranged at lateral ends of the silicon layer 504 and represent lateral regions of the lower waveguide 205 when formed in the silicon layer 504. In some embodiments, the first ridge 508-1 is centered between the second ridge 508-2 and the third ridge 508-3, but this is not a requirement.

At block 410 (and as shown in diagram 512), the one or more trenches 509-1, 509-2 are filled with silicon oxide 513-1, 513-2. More specifically, the silicon oxide 513-1 fills the trench 509-1 and the silicon oxide 513-2 fills the trench 509-2. In some embodiments, the silicon oxide is deposited using CVD, PECVD, or other suitable techniques. At block 415, a chemical-mechanical polishing (CMP) process is performed to form a uniform top surface 514 across the plurality of ridges 508-1, 508-2, 508-3 and the silicon oxide 513-1, 513-2.

At block 420 (and as shown in diagram 515), a silicon oxide layer 516 is deposited on the top surface 514, and a silicon nitride layer 517 is deposited on the silicon oxide layer 516. The silicon oxide layer 516 contacts the silicon oxide 513-1, 513-2. For purposes of the description, the silicon oxide layer 516 once deposited may be considered to include the silicon oxide 513-1, 513-2. The silicon nitride layer 517 defines a top surface 518.

In diagram 519, one or more lithography layers 520 are deposited on the top surface 518. At block 425, a trench 521 is etched from the top surface 518 through the silicon nitride layer 517 and at least partly through the silicon oxide 516 layer. In some embodiments, the trench 521 extends to the first ridge 508-1 and exposes a top surface of the first ridge 508-1.

At block 430 (and as shown in diagram 522), an upper portion 523 of the first ridge 508-1 is oxidized. The upper portion 523 represents one example of the gate dielectric layer 150. In one embodiment, the blocks 405-430 are performed during block 305 of the method 300.

In diagram 524, one or more lithography layers 525 are deposited on the top surface 518, as well as surfaces defined by the trench 521. An opening 526 extends through the one or more lithography layers 525 to the silicon oxide layer 516. In some embodiments, the opening 526 is arranged near a lateral region of the lower waveguide 205 (e.g., near the second ridge 508-2 or the third ridge 508-3). At block 435, etching is performed through the silicon oxide layer 516 to the silicon layer 504.

The one or more lithography layers 525 are removed from the silicon nitride layer 517 in diagram 527. In some embodiments, plasma ashing is used to remove the one or more lithography layers 525. An opening 528 formed by the etching extends to the silicon layer 504. In an alternate embodiment, the etching forms a trench extending partly through the silicon oxide layer 516.

At block 440 (and as shown in diagram 530), the trench 521 is filled with amorphous silicon 531. In alternate embodiments, another type of sacrificial material is deposited into the trench 521. The sacrificial material is capable of being selectively removed with minimal etch rates on the crystalline silicon and silicon oxide and silicon nitride. Filling the trench 521 operates to fill the opening 528 with amorphous silicon 531. At block 445, a CMP process is performed to form a uniform top surface 532 across the silicon nitride layer 517 and the amorphous silicon 531.

At block 450 (and as shown in diagram 533), a silicon oxide layer 534 is deposited on the top surface 532. The silicon oxide layer 534 defines a top surface 537. At block 455, an opening 536 is etched from the top surface 537 through the silicon oxide layer 534 and exposes the amorphous silicon 531. In some embodiments, the opening 526 is arranged near a first lateral region of the lower waveguide 205 (e.g., near the second ridge 508-2), and the opening 536 is arranged near an opposite, second lateral region (e.g., near the third ridge 508-3). The opening 526 may have any suitable dimensioning. In one embodiment, the opening 526 is elongated along a length of the lower waveguide 205 (as viewed, into or out of the page). In another embodiment, the opening 526 is one of a plurality of openings arranged along the direction of the optical path.

At block 460, the amorphous silicon 531 is selectively removed via the opening 536 through the silicon oxide layer 534 to form a channel 539 within the silicon oxide layer 516. In some embodiments, the channel 539 is disposed between the silicon oxide layer 534 and the silicon oxide layer 516. In one embodiment, the amorphous silicon 531 is removed using a solution with either gas phase or liquid phase comprising hydrochloric acid (HCl) and/or other etchants that will not etch the silicon oxide layers 516, 534 surrounding the channel 539.

In some embodiments, the channel 539 comprises an elongated portion 539A that is substantially parallel to the lower waveguide 205, the opening 526 that extends from the elongated portion 539A to the lower waveguide 205, and the opening 536 that is in fluid communication with the elongated portion 539A.

At block 465 (and as shown in diagram 540), monocrystalline silicon 540A is grown (or otherwise deposited) in the channel 539 through the opening 536. In some embodiments, the monocrystalline silicon 540A is grown laterally and epitaxially in the channel 539. In some embodiments, the monocrystalline silicon 540A contacts the upper portion 523 of the first ridge 508-1.

In some embodiments, the monocrystalline silicon 540A is grown using a low-temperature epitaxy process that is used for CMOS source and drain growth. In some embodiments, the low-temperature epitaxy process provides a constrained (guided) lateral overgrowth method of the monocrystalline silicon 540A.

In some embodiments, the opening 526 when filled with the monocrystalline silicon 540A is included in a defect concentration region 542 having a geometry that tends to concentrate any defects occurring in the monocrystalline silicon 540A. As the defects displace from other regions of the monocrystalline silicon 540A, a defect-free region 543 is formed in the elongated portion 539A. In some embodiments, the defect-free region 543 has a defect density that is less than $10^{12}/cm^3$, although other thresholds are also contemplated. The defect-free region 543 provides an improved uniformity of the crystalline structure, which reduces an electrical resistance and an optical insertion loss. In some embodiments, the upper waveguide 215 is formed using the defect-free region 543 of the monocrystalline silicon 540A.

In some embodiments (and as shown in diagram 544), one or more lithography layers 545 are deposited on the silicon oxide layer 534. At block 470, one or more trenches 546-1, 546-2 are etched into the monocrystalline silicon 540A through the one or more lithography layers 545 to form a ridge 547 in the monocrystalline silicon 540A. The ridge 547 represents one example of the ridge 245 depicted in FIG. 2. The one or more lithography layers 545 are removed from the silicon oxide layer 534.

In diagram 548, one or more lithography layers 549 are deposited on the silicon oxide layer 534. In some cases, the one or more lithography layers 549 extend into the one or more trenches 546-1, 546-2. At block 475, at least part of the lateral portions of the monocrystalline silicon 540A are removed, e.g., by etching. In some embodiments, etching the one or more trenches 546-1, 546-2 and removal of at least part of the lateral portions defines one or more lateral ridges 551-1, 551-2 of the upper waveguide 215. The ridge 547 is arranged between the one or more lateral ridges 551-1, 551-2 (e.g., centered between the lateral ridges 551-1, 551-2). The lateral ridges 551-1, 551-2 represent examples of lateral regions of the upper waveguide 215.

Trenches 550-1, 550-2 are etched through the silicon oxide layer 534 and at least partly through the monocrystalline silicon 540A. The trench 550-2 extends through the monocrystalline silicon 540A and partly through the silicon oxide layer 516. The trench 550-1 extends partly through the monocrystalline silicon 540A, which leaves a portion 552 of the defect concentration region 542. The depth of the trench 550-1 may be selected to provide a desired dimensioning of the portion 552 (e.g., to provide desired electrical and/or optical characteristics). As shown, the portion 552 contacts the lower waveguide 205 and is spaced apart from the upper waveguide 215.

The one or more lithography layers 549 are removed from the silicon oxide layer 534. In one embodiment, the blocks 465-475 are performed during block 315 of the method 300.

At block 480 (and as shown in diagram 553), a silicon oxide layer 554 is deposited. In some embodiments, the silicon oxide layer 554 represents a passivation layer for the optical apparatus. At block 485 (and as shown in diagram 555), a plurality of conductive contacts 556-1, 556-2, 556-3, 556-4 are formed. As shown, the plurality of conductive contacts 556-1, 556-2, 556-3, 556-4 represent examples of the vias 130 of FIGS. 1 and 2.

The conductive contact 556-1 extends through the silicon oxide layer 554, the silicon nitride layer 517, and the silicon oxide layer 516 to contact the second ridge 508-2 of the lower waveguide 205. The conductive contact 556-2 extends through the silicon oxide layer 554 to contact the lateral ridge 551-1 of the upper waveguide 215. The conductive contact 556-3 extends through the silicon oxide layer 554 to contact the lateral ridge 551-2 of the upper waveguide 215. The conductive contact 556-4 extends through the silicon oxide layer 554, the silicon nitride layer 517, and the silicon oxide layer 516 to contact the third ridge 508-3 of the lower waveguide 205. Although not shown, in some embodiments, the plurality of conductive contacts 556-1, 556-2, 556-3, 556-4 contact the lower waveguide 205 or the upper waveguide 215 via conductive contacts. In one embodiment, block 485 may represent blocks 325, 335 of the method 300. The method 400 ends following completion of block 485.

Beneficially, an optical apparatus having the lower waveguide 205 and the upper waveguide 215 formed of monocrystalline silicon offers improved performance when compared with an implementation in which the upper waveguide 215 is formed of polycrystalline silicon. More specifically, using two monocrystalline silicon waveguides in an electro-optic modulator mitigates the lower electron mobility and/or higher optical insertion loss experienced when using a polycrystalline silicon waveguide in combination with a monocrystalline silicon waveguide.

In some embodiments, for a same doping level, the series resistance including the upper waveguide 215 formed of monocrystalline silicon is about one-third ($\frac{1}{3}$) of the series resistance when including the upper waveguide 215 formed of polycrystalline silicon. Additionally, the upper waveguide 215 formed of monocrystalline silicon provides a reduced optical insertion loss, as less doping is required to achieve a particular series resistance, and due to fewer grain boundaries.

In some embodiments, the optical apparatus having two monocrystalline silicon waveguides formed according to techniques described herein offers a bandwidth increase of about 50% or more, when compared with an implementation in which one of the waveguides is formed of polycrystalline silicon. As a result, the electro-optic modulator is capable of supporting significantly greater optical bandwidths, such as modulating at 100 Gb/s or greater. Further, the electro-optic modulator may be fabricated without requiring advanced fabrication techniques, which tends to reduce fabrication cost and complexity. For example, low-temperature epitaxy process that is commonly used for complementary metal-oxide-semiconductor (CMOS) source and drain growth may be used to form at least one of the monocrystalline silicon waveguides of the electro-optic modulator.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of fabricating an optical apparatus, the method comprising:
    forming a first waveguide on a dielectric substrate, wherein the first waveguide extends in a direction of an optical path, and wherein the first waveguide comprises a monocrystalline semiconductor material and is doped with a first conductivity type;
    depositing a first dielectric layer on the first waveguide; and
    forming a second waveguide at least partly overlapping the first waveguide along the direction, wherein the second waveguide is doped with a different, second conductivity type, wherein forming the second waveguide comprises:
        depositing a monocrystalline semiconductor material on the first dielectric layer; and
        forming a plurality of lateral ridges in the deposited monocrystalline semiconductor material by:
            etching a plurality of trenches partly through the deposited monocrystalline semiconductor material; and
            etching at least partly through lateral portions of the deposited monocrystalline semiconductor material.

2. A method of fabricating an optical apparatus, the method comprising:
    forming a first waveguide on a dielectric substrate, wherein the first waveguide extends in a direction of an optical path, and wherein the first waveguide comprises a monocrystalline semiconductor material and is doped with a first conductivity type;
    depositing a first dielectric layer on the first waveguide;
    etching a first opening that extends at least partly through the first dielectric layer; and
    forming a second waveguide at least partly overlapping the first waveguide along the direction, wherein the second waveguide is doped with a different, second conductivity type,
    wherein forming the second waveguide comprises depositing a monocrystalline semiconductor material on the first dielectric layer, whereby the first opening is filled with the deposited monocrystalline semiconductor material, and
    wherein the first opening filled with the monocrystalline semiconductor material is included in a defect concentration region.

3. The method of claim 2, wherein a lower surface of a gate dielectric layer contacts an upper surface of the first waveguide, and
    wherein the second waveguide contacts an upper surface of the gate dielectric layer opposite the lower surface.

4. The method of claim 2, further comprising:
    before depositing the monocrystalline semiconductor material on the first dielectric layer, depositing a sacrificial material on the first dielectric layer, whereby the first opening is filled with the sacrificial material;
    performing a chemical-mechanical polishing process;
    depositing a second dielectric layer on the sacrificial material;
    etching a second opening that extends through the second dielectric layer; and
    selectively removing the sacrificial material via the second opening to form a channel between the first dielectric layer and the second dielectric layer,
    wherein depositing the monocrystalline semiconductor material on the first dielectric layer comprises:
        depositing the monocrystalline semiconductor material into the channel via the second opening.

5. The method of claim 4,
    wherein the first opening is arranged near a first lateral region of the first waveguide, and
    wherein the second opening is arranged near an opposite, second lateral region of the first waveguide.

6. The method of claim 2, wherein the monocrystalline semiconductor material for the second waveguide is one of the following:
    monocrystalline silicon;
    monocrystalline germanium; and
    gallium arsenide.

7. The method of claim 2, wherein the first opening extends through the first dielectric layer to the first waveguide.

8. The method of claim 2, wherein forming the first waveguide comprises forming a first ridge extending in the direction,
    wherein forming the second waveguide comprises forming a second ridge extending in the direction, and
    wherein the second ridge overlaps the first ridge.

9. The method of claim 8, wherein forming the first ridge extending in the direction comprises:
    etching a plurality of trenches partly through the first waveguide;
    filling the plurality of trenches with a dielectric material; and
    performing a chemical-mechanical polishing process.

10. The method of claim 9, further comprising:
oxidizing an upper portion of the first ridge to form a gate dielectric layer,
wherein the second waveguide contacts an upper surface of the gate dielectric layer.

11. The method of claim 2, further comprising:
forming a plurality of vias,
wherein at least a first via of the plurality of vias extends at least partly through the first dielectric layer and is electrically coupled with the first waveguide, and
wherein at least a second via of the plurality of vias is electrically coupled with the second waveguide.

12. The method of claim 11, further comprising:
forming a first electrical contact that contacts a lateral portion of the first waveguide; and
forming a second electrical contact that contacts a lateral portion of the second waveguide,
wherein the first via contacts the first electrical contact, and
wherein the second via contacts the second electrical contact.

13. An optical apparatus comprising:
a first waveguide on a dielectric substrate, wherein the first waveguide extends in a direction of an optical path, and wherein the first waveguide comprises a monocrystalline semiconductor material and is doped with a first conductivity type;
a second waveguide at least partly overlapping the first waveguide along the direction, wherein the second waveguide comprises a monocrystalline semiconductor material and is doped with a different, second conductivity type;
a dielectric layer arranged between portions of the first waveguide and the second waveguide; and
a remaining portion of a defect concentration region arranged within the dielectric layer, wherein the remaining portion is formed of the monocrystalline semiconductor material used to form the second waveguide.

14. The optical apparatus of claim 13, wherein the monocrystalline semiconductor material used to form the second waveguide extends into an opening formed through the dielectric layer, and
wherein the monocrystalline semiconductor material extending into the opening is included in the defect concentration region.

15. The optical apparatus of claim 14,
wherein the monocrystalline semiconductor material used to form the second waveguide extends through the opening to the first waveguide, and
wherein the remaining portion of the defect concentration region contacts the first waveguide.

16. The optical apparatus of claim 13, wherein the monocrystalline semiconductor material for the second waveguide is one of the following:
silicon;
germanium; and
gallium arsenide.

17. The optical apparatus of claim 16, wherein the monocrystalline semiconductor material for the second waveguide is silicon, and
wherein the dielectric layer is a silicon oxide layer.

18. A method of fabricating an optical apparatus, the method comprising:
forming a first waveguide on a dielectric substrate, wherein the first waveguide extends in a direction of an optical path, and wherein the first waveguide comprises a monocrystalline semiconductor material and is doped with a first conductivity type;
depositing a dielectric layer on the first waveguide;
forming a channel within the dielectric layer, wherein the channel includes:
an elongated portion that is substantially parallel to the first waveguide;
a first opening that extends from the elongated portion to the first waveguide; and
a second opening in fluid communication with the elongated portion; and
forming a second waveguide at least partly overlapping the first waveguide along the direction, wherein the second waveguide is doped with a different, second conductivity type,
wherein forming the second waveguide comprises depositing a monocrystalline semiconductor material into the channel through the second opening, whereby the first opening is filled with the deposited monocrystalline semiconductor material.

19. The method of claim 18,
wherein the first opening is arranged near a first lateral region of the first waveguide, and
wherein the second opening is arranged near an opposite, second lateral region of the first waveguide.

20. The method of claim 18, wherein the first opening filled with the monocrystalline semiconductor material is included in a defect concentration region.

* * * * *